United States Patent [19]

Albizzati et al.

[11] Patent Number: 4,808,397

[45] Date of Patent: Feb. 28, 1989

[54] PROCESS FOR PREPARING FINE PARTICLES OF METAL OXIDES

[75] Inventors: Enrico Albizzati, Arona; Emiliano M. Ceresa, Sordevolo; Luciano Zaninetta, Arona, all of Italy

[73] Assignee: Montedison S.p.A., Milan, Italy

[21] Appl. No.: 78,088

[22] Filed: Jul. 27, 1987

[30] Foreign Application Priority Data

Jul. 31, 1986 [IT] Italy ............................ 21335 A/86

[51] Int. Cl.⁴ .................... C01G 25/02; C01G 23/04; C01B 33/113; C01B 35/10
[52] U.S. Cl. .................................... 423/608; 423/325; 423/278; 423/335; 423/338; 423/339; 423/609; 423/610; 423/625; 501/8; 501/9
[58] Field of Search ............... 423/608, 609, 610, 625, 423/338, 339, 278, 335, 325, 69; 502/8, 9

[56] References Cited

U.S. PATENT DOCUMENTS

| | | | |
|---|---|---|---|
| 3,242,218 | 3/1966 | Miller | 568/683 |
| 3,665,041 | 5/1972 | Sianesi et al. | 568/385 |
| 3,715,378 | 2/1973 | Sianesi et al. | 252/79 |
| 4,011,096 | 3/1977 | Sandell | 423/335 |
| 4,090,887 | 5/1978 | Marquisee et al. | 106/309 |
| 4,523,039 | 6/1985 | Lagow et al. | 568/683 |
| 4,621,068 | 11/1986 | Hansen | 423/338 |

FOREIGN PATENT DOCUMENTS

| | | | |
|---|---|---|---|
| 0148482 | 7/1985 | European Pat. Off. | 568/683 |
| 0191490 | 8/1986 | European Pat. Off. | 568/683 |
| 32775 | 3/1980 | Japan | 423/338 |
| 37207 | 4/1981 | Japan | 423/608 |
| 137827 | 7/1985 | Japan | 423/608 |
| 865791 | 9/1981 | U.S.S.R. | 423/338 |
| 1104482 | 2/1968 | United Kingdom | 568/683 |
| 1226566 | 3/1971 | United Kingdom | 568/683 |

OTHER PUBLICATIONS

Kirk Othmer Encyclopedia of Chemical Technology, vol. 10, Third Ed., John Wiley & Sons, N.Y., 1980, pp. 874–879.
Grant & Hackh's Chemical Dictionary, Fifth Ed., McGraw Hill Book Company, N.Y., p. 555.

Primary Examiner—Robert L. Stoll
Assistant Examiner—Paige C. Harvey
Attorney, Agent, or Firm—Stevens, Davis, Miller & Mosher

[57] ABSTRACT

A process for preparing spheroid particles of oxide compounds, having an average diameter of smaller than 3 microns. An emulsion is prepared of a hydrolyzable liquid oxide compound in a perfluoropolyether, the emulsion is reacted with water, water vapor or with a mixture, in any ratio, of water with a liquid miscible or immiscible with water so as to form an oxide hydrate which is recovered dried and calcined. Oxide compounds include oxides of Ti, Al, Zr, Si or B.

11 Claims, No Drawings

PROCESS FOR PREPARING FINE PARTICLES OF METAL OXIDES

DESCRIPTION OF THE INVENTION

The present invention relates to a process for preparing fine particles of metal oxides and non-metal oxide. More particularly, it relates to a process for preparing spheroidal particles of metal oxides having a submicronic average diameter, or having an average diameter smaller than 3 microns. The particles thus produced are used, e.g., in the preparation of ceramic materials.

It is already known to prepare fine particles of metal oxides by reaction with water vapor of an aerosol of hydrolyzable metal compounds in an inert gas. This method shows several drawbacks. First of all, the metal compound must be completely evaporated before forming the aerosol, with a consequent high energy consumption. Furthermore, the method implies the use of large volumes of inert gas, which must moreover have a particularly low level of moisture. On the other hand, only hydrolyzable metal compounds having a high vapor pressure can be used. Finally, the method has a poor potentiality, requires high investment costs, and involves a high production cost.

An object of the present invention is to provide a process for preparing fine particles of metal oxides and non-metal oxides which overcomes the above drawbacks.

This and still other objects are achieved by the process of the present invention for preparing spheroidal particles of metal oxides of average diameter smaller than 3 microns. The process is characterized in that an emulsion is prepared of a hydrolyzable liquid metal compound in a perfluoropolyether, and the emulsion is reacted with water, with water vapor or with a mixture, in any ratio, of water with a liquid miscible or immiscible with it, which does not interfere with the reaction of the metal compound with water. In this way a metal oxide hydrate is formed which is separated, the metal oxide hydrate being then dried and calcined to the oxide.

By the term "hydrolyzable metal compound" is meant a metal compound able to react with water to yield the corresponding metal oxide hydrate.

The hydrolyzable metal compound is preferably a compound of Ti, Al, Zr, Si, or B.

The perfluoropolyethers are per se well known compounds described, e.g., in patentsto which reference is made hereafter.

Suitable perfluoropolyethers for forming the emulsions or hydrolyzable metal compounds are, particularly, those complying with the following formulae (A) to (G), and having a viscosity of from 4 to 1500 cSt:

(A) $CF_3O\text{---}(C_3F_6O)_m(C_2F_4O)_n(CFXO)_q\text{---}CF_3$ wherein X is equal to —F or —$CF_3$; m, n and q are integers; the ratio

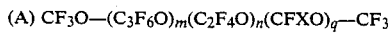

being within the range of from 1 to 50, and n/q being within the range of from 1 to 10, with the oxyperfluoroalkylene units randomly distributed along the chain. The preparation of these compounds is described in U.S. Pat. No. 3,665,041.

(B) $C_3F_7O(C_3F_6O)_m\text{---}Rf$ wherein $R_f$ is —$C_2F_5$ or —$C_3F_7$ and m is an integer greater than 2. The preparation of these compounds is described in U.S. Pat. No. 3,242,218.

(C) $CF_3O(C_2F_4O)_p(CF_2O)_q\text{---}CF_3$ wherein p and q are integers equal to or different from each other, and the p/q ratio is within the range of from 0.5 to 1.5, the oxyperfluoroalkylene units being randomly distributed along the chain. The preparation of these compounds is described in U.S. Pat. Nos. 3,715,378 and 3,665,041.

(D) $CF_3O(C_3F_6O)_m(CFXO)_n\text{---}CF_2Y$ wherein X and Y, equal to or different from each other, are —F or —$CF_3$; m and n are integers and the m/n ratio is within the range of from 5 to 40, the oxyperfluoroalkylene units being randomly distributed along the chain. The preparation of these compounds is described in U.K. Pat. Nos. 1,104,482 and 1,226,566.

(E) Perfluoropolyethers having an oxetane structure, as described in European Patent application No. 191,490.

(F) $R'_fO(CF_2CF_2O)_pR_f$ wherein $R_f$ and $R'_f$, equal to or different from each other, are —$CF_3$ or —$C_2F_5$, and p is an integer such that the viscosity is within the stated range. Products of this type are described in U.S. Pat. No. 4,523,039.

(G) $R'_fO(CF_2CF_2CF_2O)_sR_f$ wherein $R_f$ and $R'_f$, equal to or different from each other, are —$CF_3$ or —$C_2F_5$ and s is an integer such that the viscosity is within the stated range. Products of this type are described in European Patent application No. 148,482.

Usually, the perfluoropolyether used to form the emulsion has a viscosity within the range of from 4 to 200 cSt.

The hydrolyzable metal compounds used to form the emulsions are, e.g., the alkoxides and haloalkoxides of Al, Ti, Zr and B (such as the isopropyloxide, sec-butyloxide, n-butyloxide, and n-propyloxide, halides, such as $TiCl_4$, $BCl_3$ and $SiCl_4$, and those halide complexes which are liquid at emulsifying temperature: e.g., $AlCl_3$-complexes with aromatic esters and $TiCl_4$-complexes with long-chain aliphatic ethers. These metal compounds must be liquid at the emulsifiying temperature. Usually, the emulsion is prepared at ambient temperature. However, one may operate at a lower or higher than ambient temperature, e.g., within the range of from $-30°$ to $+90°$ C.

The alkoxides may be used as solutions in their corresponding alcohol. When Al, Ti, Zr or B oxides are to be prepared, the alkoxides are commonly used as the starting materials.

The ratio, by volume, of the hydrolyzable metal compound to the perfluoropolyether in the emulsion is within the range of from 0.01 to 1.

The emulsion is preferably prepared in the presence of an emulsion stabilizer consisting or consisting essentially of a perfluoropolyether having a functional end grop. Preferably, the perfluoropolyether having a functional end group has the following end groups:

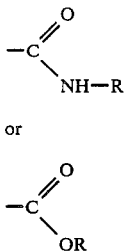

or wherein R is a linear, branched or cyclic alkyl of from 1 to 20 carbon atoms, or an alkylaryl of from 7 to 20 carbon atoms; R may also contain heteroatoms, in particular O and/or Si atoms, and substituents, e.g., Cl.

Examples of suitable emulsion stabilizers are:

$$CF_3—(OC_3F_6)_n(OCF_2)_m—O—CF_2—COO—CH_2—CH—CH_3 \quad (I)$$
$$\phantom{CF_3—(OC_3F_6)_n(OCF_2)_m—O—CF_2—COO—CH_2—}CH_3$$

$$CF_3—(OC_3F_6)_n(OCF_2)_m—OCF_2—COO—CH_2—CHOH—O—(CH_2)_3—Si(OMe)_3 \quad (II)$$

$$CF_3—(OC_3F_6)_n(OCF_2)_m—O—CF_2CO—N-H—(CH_2)_3—Si(OEt)_3 \quad (II)$$

The amount of emulsion stabilizer is generally within the range of from 0.01 to 5% by weight based on perfluoropolyether; more usually, from 0.1 to 0.5% thereof is used.

Any process allowing one to obtain the emulsion may be conveniently used in the process of this invention.

The emulsion may be prepared, e.g., by means of strong stirring, e.g., by using un ultraturrax stirrer. The emulsion is prepared under an adequate stirring. By increasing the stirring rate, smaller particles of metal oxide hydrate are obtained.

With increasing viscosity of the perfluoropolyether, particles of metal oxide hydrate of larger dimensions are obtained.

A first method for carrying out the hydrolysis consists in adding the emulsion to water, with stirring.

A second method consists in adding, always with stirring, the emulsion to water mixed, in any ratio, with a liquid miscible or immiscible with it.

Among the water-miscible liquids which may be used according to the present invention, the alcohols of from 1 to 8 carbon atoms and ethylene glycol ma be mentioned. Among the immiscible liquids, perfluoropolyethers, hydrocarbons, and silicone oils may be mentioned. More commonly, water is present in such blends in amounts ranging from 0.1 to 90% by volume.

A third method for carry out the hydrolysis consists or consists essentially in adding the emulsion to water vapor. Water vapor may be used as such, or contained in a gas, such as, e.g., nitrogen; usually, a gas saturated with water is used. In this case, the sphericity of the oxide hydrate is generally improved.

The amount of water relative to the metal compound may vary over a wide range. The minimum amount is that amount which is stoichiometrically required to carry out the hydrolysis reaction. However, large excesses of water may be used, and an amount of water equal to 2.5 times the stoichiometric ratio is commonly used.

The emulsion may be prepared and introduced into the liquid water phase (water, or blends thereof with other liquids) by a high-linear-speed stream. For that purpose a homogeneous mixture is prepared of the hydrolyzable metal compound and of the perfluoropolyether, and the mixture is passed, under pressure, through a tube having a length equal to from 500 to 3000 times its diameter, and wherein the linear speed of the mixture is greater than 1 meter/second. Such a stream may be introduced into a vessel containing the liquid aqueous phase, or into a recycled circuit wherein the liquid aqueous phase is circulated. When such a stream is used, the emulsion pressure is generally within the range of from 2 to 90 atms.

By thus injecting the emulsion, the diameter of the metal oxide hydrate particles is reduced.

By operating with a high-linear-speed emulsion stream, the introduction of the emulsion into the liquid aqueous phase requires a short time. When such a procedure is not used, the introduction of the emulsion into the liquid aqueous phase or the introduction of the liquid aqueous phase into the emulsion is preferably gradual; it is carried out, e.g., over a time of from 1 to 30 minutes.

The hydrolysis step may be preceded by a prehydrolysis; i.e., a small amount of water is introduced into the emulsion before the true hydrolysis is performed. Usually, from 5 to 10% of the total amount of water used in the process is thus introduced with stirring. Usually, this water addition is instantaneous. After such an addition, stirring is continued for a certain time, e.g., for 5 minutes, before the true hydrolysis is carried out. This pre-hydrolysis improves the sphericity of the metal oxide hydrate.

The hydrolysis is commonly carried out at ambient temperature. However, operating at a lower or higher temperature, e.g., within the range of from $-30°$ to $+90°$ C., is possible. When operating below $0°$ C., the water must be in the presence of a substance which lowers its freezing point, such as ethylene glycol.

The separation of the metal oxide hydrate from the liquid phase at the end of the hydrolysis may be carried out by known methods, e.g., by filtration.

The metal oxide hydrate is dried by per se known methods. The calcination is carried out, as is well-known, at different temperatures, depending on the nature of the metal oxide hydrate and its desired crystalline form.

The present invention is also suitable for preparing mixed metal oxides.

The following Examples are given for still better illustrating the inventive concept of the present invention.

EXAMPLE 1

To a 500-cc stainless-steel autoclave equipped with an anchor stirrer, 200 cc of a perfluoropolyether Fomblin Y of viscosity 20 cSt, sold by Montefluos S.p.A., and 200 cc of titanium tetra-n-butoxide are added at room temperature. Fomblin Y is within the formula:

$$CF_3O—(C_3F_6O)_n(CF_2—O)_m—CF_3 \quad (IV)$$

where m and n are as defined above.

The mixture is stirred for 5 minutes to homogenize it. Then, under an overpressure of 10 atm of nitrogen, which is kept constant throughout the duration of test, within 30-seconds seconds time the mixture is passed through a stainless-steel 4 meter long tube having an inner diameter of 2 mm, to form the emulsion, which is discharged into a glass flask containing 2 liters of distilled water kept vigorously stirred.

The so-formed suspension is filtered over a Millipore filter with a cut-off of 0.2 microns; the obtained solid is washed with distilled water, and then with trichlorofluoromethane. The solid is oven-dried and inspected by scanning electron microscope, while its granulometric distribution is analyzed by the sedigraph technique. The particles have spheroidal shape and an average diameter of 0.5 microns.

EXAMPLE 2

Example1 is repeated, by using, instead of titanium alkoxide, an equal volume of aluminum sec-butyloxide, and a nitrogen overpressure of 15 atm.

The thus-obtained solid has a spheroidal shape and an average diameter of 0.3 microns.

EXAMPLE 3

Example 1 is repeated, by using, instead of titanium alkoxide, an equal volume of Zr n-propyloxide dissolved in propanol, and a nitrogen overpressure of 15 atm.

The thus-obtained solid has a spherical shape and an average diameter of 0.3 microns.

EXAMPLE 4

To the same autoclave of Example 1, 200 cc of perfluoropolyether Galden/D05 of 5 cSt viscosity sold by Montefluos S.p.A., 5 cc of isopropyl titanate and 0.2 cc of an amidosilane of Fomblin Y, having an acidimetric equivalent weight of 5000, are added. Galden/D05 is within formula (IV) of Example 1, and the above Fomblin Y amidosilane is within formula (III) as reported in the description.

The whole is stirred for 5 minutes and, under an over-pressures of 30 atmospheres of nitrogend, kept constant throughout the test duration, within a 50-second time, the so-formed mixture is discharged through a 1-meter long stainless-steel tube having an inner diameter of 1 mm, into a glass flask, equipped with an anchor stirrer, containing 800 cc of Galden/D05, 3.2 cc of distilled water, and 0.5 cc of Rioklen NF 10 (ethoxylated alkylphenyl), with stirring at 1500 rpm.

The solid, isolated by the same procedures as those of Example 1, has a spheroidal shape and an average diameter of 0.5 microns.

EXAMPLE 5

Example 4 is repeated, with the exception of the following specifically indicated modifications:

5.77 g of aluminum sec-butyloxide and a nitrogen over-pressure of 60 atm are used. The mixture is discharged within 15 minutes and 30 seconds through a 1-meter long stainless-steel tube of 0.75 mm internal diameter, into a circuit containing 2.5 liters of Galden/D05 and 3.2 cc of distilled water.

The solid, isolated by the same procedures as in Example 1, has a spheroidal shape and a diameter of 2 microns.

EXAMPLE 6

Example 5 is repeated, with the exception of the following specifically indicated modifications:

7.75 cc of zirconium n-propyloxide in solution in its corresponding alcohol and 150 cc of perfluoropolyether are used.

Before discharging the mixture, 0.16 cc of distilled water are added, and the mixture is discharged a few minutes later. The mixture is discharged within 14-minutes time. The solid, isolated by the same procedures as of Example 1, has a spheroidal shape and an aaverage diameter of 1.5 microns.

EXAMPLE 7

To a 2-liter glass reactor, equipped with an anchor stirrer, 200 cc of perfluoropolyether Galden/D20, having a viscosity of 18 cSt, sopld by Montefluos S.p.A., 5 cc of isopropyl titanate and 0.2 cc of the above Fomblin Y amidosilane are charged. Galden/D20 is within formula (IV) of Example 1.

The reactor contents are stirred 5 minutes at 600 rpm, and are then discharged by gravity into an underlying flask equipped with an anchor stirrer, containing 800 cc of Galden/D20 and 3.2 cc of distilled water, kept vigorously stirred (1000 rpm).

The solid, isolated by the same procedures as in Example 1, has a spheroidal shape, and an average diameter of 2 microns.

EXAMPLE 8

Example 5 is repeated, but with the difference that 0.16 cc of distilled water is charged to the autoclave, and that before discharging the autoclave contents, some minutes are allowed to elapse.

The solid, isolated by the same procedures as in Example 1, has a spheroidal shape, and an average diameter of 2 microns.

EXAMPLE 9

To a glass vessel, 200 cc of perfluoropolyether Galden/D05, 5 cc of isopropyltitanate and 0.2 cc of the above Fomblin Y amidosilane are charged. The contents of the vessel are stirred 5 minutes b an ultratrrax stirrer, at a speed of 4500 rpm, and, with the stirring being maintained, 3.2 cc of distilled water are then added dropwise.

The solid, isolated by the same procedures as in Example 1, has a spheroidal shape, and an average diameter of 0.3 micron.

What is claimed is:

1. A process for preparing spheroidal particles of an oxide compound selected from the group consisting of Ti, Al, Zr, Si and B, having an average diameter of less than 3 microns, comprising:
   preparing an emulsion in a perfluoropolyether of a hydrolyzable liquid compound of an element selected from the group consisting of Ti, Al, Zr, Si and B;
   reacting the emulsion with water, with water vapor or with a mixture, in any ratio, of water with a liquid miscible or immiscible with water, said liquid not interfering with the reaction of the oxide compound with water, to obtain an oxide hydrate;
   recovering said oxide hydrate, drying and calcining said oxide hydrate to an oxide.

2. The process according to claim 1, wherein the perfluoropolyether has a viscosity of from 4 to 1500 cSt, and is selected from the group consisting of:

(A) $CF_3O\text{—}(C_3F_6O)_m(C_2F_4O)_n(CFXO)_1\text{—}CF_3$ wherein X is equal to —F or —$CF_3$; m, n and q are integers; the ratio $$\frac{m}{n+q}$$

being within the range of from 1 to 50 and the ratio n/q being within the range of from 1 to 10; the oxyperfluoroalkylene units being randomly distributed along the chain;

(B) $C_3F_7O(C_3F_6O)_m\text{—}R_f$ wherein $R_f$ is —$C_2F_5$ or —$C_3F_7$ and m is an integer greater than 2;

(C) $CF_3O(C_2F_4O)_p(CF_2O)_q\text{—}CF_3$ wherein p and q are integers equal to or different from each other and the ratio p/q being within the range of from 0.5 to 1.5; the oxyperfluoroalkylene units being randomly distributed along the chain;

(D) $CF_2O(C_3F_6O)_m(CFXO)_n\text{—}CF_2Y$ wherein X and Y, are equal to or different from each other, and are —F or —$CF_3$; m and n are integers and the ratio m/n being within the range of from 5 to 40; the oxyperfluoroalkylene units being randomly distributed along the chain;

(E) perfluoropolyethers having an oxetane structure;

(F) $R'_fO(CF_2CF_2O)_pR_f$ wherein $R_f$ and $R'_f$ are equal to or different from each other, and are —$CF_3$ or —$C_2F_5$ and p is an integer such that the viscosity is within the stated range; and (G) $R'_fO(CF_2CF_2CF_2O)_sR_f$ wherein $R_f$ and $R'_f$, are equal to or different from each other, and are —$CF_3$ or —$C_2F_5$ and s is an integer such that the viscosity is within the stated range.

3. The process according to claim 1, wherein the hydrolyzable oxide compound of Ti, Al, Zr, Si or B is an alkoxide.

4. The process according to claims 1 or 2, wherein the ratio by volume of the hydrolyzable oxide compound to the perfluoropolyether in the emulsion is within the range of from 0.01 to 1.

5. The process according to claims 1 or 2, wherein the emulsion of the hydrolyzable oxide compound in the perfluoropolyether is prepared in the presence of an emulsion stabilizer consisting essentially of a perfluoropolyether having a functional end group is selected from the group consisting of:

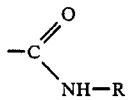

and

wherein R is a linear, branched or cyclic alkyl of from 1 to 20 carbon atoms, or an alkylaryl or from 7 to 20 carbon atoms; and R may also contain heteroatoms.

6. The process according to claim 5, wherein the amount of emulsion stabilizer is within the range of from 0.01 to 5% by weight based on the perfluoropolyether.

7. The process according to claim 6, wherein the liquid miscible with water is an alcohol of from 1 to 8 carbon atoms, or ethylene glycol.

8. The process according to claims 1 or 2, wherein the liquid immiscible with water is a perfluoropolyether, a hydrocarbon, or a silicone oil.

9. The process according to claims 1 or 2, wherein the mixture of water with a liquid miscible or immiscible therewith is present in an amount ranging from 0.1 to 90% by volume.

10. The process according to claims 1 or 2, wherein the emulsion of the hydrolyzable oxide compound in the perfluoropolyether is obtained by passing a homogeneous mixture of said oxide compound, under pressure, through a tube having a length from 500 to 3000 times its diameter, and wherein the linear speed of the mixture is greater than 1 meter/second.

11. The process according to claims 1 or 2, wherein prior to reacting the emulsion with water, with water vapor, or with the water-liquid mixture, a small amount of water is added to the emulsion.

* * * * *